United States Patent [19]

Jensen et al.

[11] Patent Number: 5,026,176
[45] Date of Patent: Jun. 25, 1991

[54] EXTENDABLE RAIL SYSTEM

[75] Inventors: Claus Jensen, West Vancouver; Leslie M. Nunn, Richmond, both of Canada

[73] Assignee: C. J. Management, Ltd., New Westminster, Canada

[21] Appl. No.: 418,865

[22] Filed: Oct. 10, 1989

[51] Int. Cl.$^5$ .................. A47B 1/10; B65H 59/10; F16C 19/00
[52] U.S. Cl. ..................... 384/53; 188/67; 312/333; 312/334; 384/17
[58] Field of Search ............ 384/19, 21, 35, 50, 384/53, 55, 17; 296/37.1, 37.6; 312/332, 333, 334, 348; 188/67

[56] References Cited

U.S. PATENT DOCUMENTS

| | | | |
|---|---|---|---|
| 2,284,419 | 5/1942 | Greig | 296/26 |
| 2,545,269 | 3/1951 | Ford | 312/337 |
| 2,784,027 | 3/1957 | Temp | 296/23 |
| 3,203,749 | 8/1965 | Bullock et al. | 312/339 |
| 3,298,768 | 1/1967 | Vogt . | |
| 3,471,045 | 10/1969 | Panciocco | 214/83.24 |
| 3,661,431 | 5/1972 | Wisecarver | 384/55 |
| 3,701,577 | 10/1972 | Fischer | 312/339 |
| 3,998,497 | 12/1976 | Koizumi | 384/53 |
| 4,197,600 | 4/1980 | Slabic | 5/118 |
| 4,427,246 | 1/1984 | MacDonald | 312/348 X |
| 4,452,098 | 6/1984 | Wallace et al. | 188/67 X |
| 4,469,364 | 9/1984 | Rafi-Zadeh | 296/37.6 |
| 4,635,992 | 1/1987 | Hamilton et al. | 296/37.6 |
| 4,681,360 | 7/1987 | Peters et al. | 296/37.6 |
| 4,705,315 | 11/1987 | Cherry | 296/37.1 |

*Primary Examiner*—Daniel P. Stodola
*Assistant Examiner*—William G. Battista
*Attorney, Agent, or Firm*—Shlesinger, Arkwright and Garvey

[57] ABSTRACT

An extendable rail system is comprised of a support beam, a slide beam and a storage beam. The slide beam and storage beam extend horizontally and are supported by load rollers at one end and by a grooved roller at the other end. The grooved roller of the slide beam mates with an extension of the support beam. The grooved roller of the storage beam mates with an extension on the slide beam. The slide beam includes first and second lateral flanges. Roller members attached to the support beam and to the storage beam, roll along the inner tracks of the flanges to hold the slide beam adjacent the support beam and the storage beam adjacent the slide beam. A brake is provided comprising a rod extending the length of the storage beam and first and second member connected to the storage beam. Both members have an opening for slidable movement of the members along the tube. The second opening has an axis offset from the axis of the first opening which causes braking of the storage beam when one member is twisted with respect to the other member so that the axes of the respective openings are not in alignment.

25 Claims, 9 Drawing Sheets

EXTENDABLE RAIL SYSTEM

FIELD OF THE INVENTION

This invention relates generally to an extendable rail system and more particularly to a system having a set of beams which may be extended with respect to a support structure.

BACKGROUND OF THE INVENTION

A variety of extendable rail systems have been devised to permit extension of one structure in a horizontal direction from a supporting structure. Examples can be found in the drawer art and also in art relating to vehicles permitting extension of storage containers and the like from the interior cavity of such vehicles. Such structures typically include a support structure upon which a guiding structure is mounted. One or more beam structures extend horizontally from the guiding means. These beams may be extended and retracted in a horizontal direction. Usually, wheels or rollers are provided to assist in the horizontal movement of the beams from the support structure and also to support the beams. The outermost beam is usually used to attach a storage container, whether it be a drawer or containers for storing tools and the like. This permits the container to be pulled outward in a horizontal direction from the storage cavity.

An example of an extendable rail system used in a drawer, is found in U.S. Pat. No. 3,203,749 issued on Aug. 31, 1965 to Bullock et al. This patent discloses the use of a lower rail attached to the support structure, an intermediate suspension rail which extends from the support rail for a pre-determined distance and a drawer rail which extend from the suspension rail for a pre-determined distance. The drawer rail supports a drawer.

A similar rail structure is disclosed in U.S. Pat. No. 3,298,768 issued to Vogt on Jan. 17, 1967. In Vogt, a case rail is attached to the framework of the drawer cabinet. This case rail supports an intermediate rail which includes several rollers for rolling within the case rail. The intermediate rail has a second row of rollers which support a drawer rail. The rollers permit the intermediate rail to be extended horizontally from the case rail and the second set of rollers permit the drawer rail to be extended horizontally a further distance with respect to the intermediate rail. A drawer is attached to the drawer rail and may be extended horizontally on this rail system.

U.S Pat. No. 4,705,315 issued to Cherry on Nov. 10, 1987 shows an extendable rail system used in conjunction with the cargo space of a trade van. Cherry provides a frame assembly having two parallel van frames which is attached to the van storage space body. Rollers are provided on the frame assembly and slide rails are provided as intermediate sections having channels for receiving the rollers. The slide rail has a second channel for receiving rollers attached to a container frame to which a container may be attached. In this way, a container may be pulled horizontally from the van cargo space by extending the slide rail along the first set of rollers and the container frame along the second set of rollers to extend the container from the van.

In most of these operations, particularly where a heavy load is to be placed on the container, a three-part rail assembly is preferred. The first rail is attached to the support structure, the second rail is slidable along the first rail and a third rail, slidable along the second rail, is attached to the storage container. Generally rollers are placed between the sliding portions to facilitate horizontal movement. The three-part slide mechanism is generally stronger than a two-part slide mechanism and is preferred where heavy objects are to be placed in the storage container. As well, this configuration permits the container to be moved for a greater horizontal distance as compared to an equivalent two rail system.

The difficulty with the above designs for a drawer rail structure is that if extremely heavy weights are placed in the storage container, the weight on the storage container will generally cause a twisting action to be placed on the wheels causing binding and even breakage of the rollers from the corresponding rail. This may cause complete failure of the rail system.

The structure disclosed in Cherry has the disadvantage of requiring at least two rails to sandwich the rollers therebetween so that the storage container can be properly supported when extended. The distance between adjacent parallel rails is critical and must be close enough to prevent the rollers from twisting out of the rail and yet must not be too close to prevent the rails from binding or rubbing against the rollers as they move along the rail tracks. Furthermore, Cherry provides that the entire weight of the storage container rests solely on the rollers, making it more difficult to roll the rollers when the storage container is being extended or retracted. As well, this weight on the rollers makes it more likely that the rail will twist from the weight of the roller and that the rollers may slip out, causing the storage container to fall.

A further disadvantage of all these prior systems is that they become difficult to open if the support structure and beams are positioned at an angle from the horizontal. With these systems, significant binding will occur as the system is tilted from the horizontal due to the forces of gravity acting laterally on the rollers and other components of the prior systems causing them to bind, preventing or inhibiting proper extension and retraction of the rails. This is a particular problem with rail systems mounted on vehicles which may be stopped on a surface, such as a hill, which is angled from the horizontal.

Accordingly, it is an object of the present invention to provide an extendable rail system designed to take a greater weight load than before. It is a further object of this invention to provide a guiding mechanism to keep the rails generally moving in a linear direction when the beams are extended or retracted.

It is a further object of the invention to provide a brake means to hold the rail assembly at any horizontal position between and including the fully retracted and fully extended positions.

It is a further object of the invention to provide an extendable rail system which operates adequately when angled from a horizontal position.

SUMMARY OF THE INVENTION

According to the invention, there is provided an extendable rail system for extending and retracting in relation to a support structure. The system includes a first beam and first and second extensions in parallel spaced relationship, extending laterally from opposite sides of the first beam member, to form opposed tracks along inner sides of the extensions. A first guiding means is connected to the support structure for guiding the first beam in a pre-determined direction between a retracted position and an extended position. First rolling means are rotatably connected to the first beam and are responsive to the guiding means to move in said pre-determined direction. First support rotating means are rotatably connected to the support structure for supporting the first beam and for rotating responsive to movement of the first beam on the first support rotating means between the retracted position and the extended position of the first beam. A pair of opposed first member rollers are rotatably connected to the support structure and are adopted for rolling along corresponding inner tracks of said first extension. A second beam is included with a second guiding means connected to the first beam to guide the second beam in a pre-determined direction between a retracted position and an extended position. Second rolling means are rotatably connected to the second beam member and are responsive to the second guiding means to move in the pre-determined direction. Second support rotating means are rotatably connected to the first beam supporting the second beam and for rotating responsive to movement of the second beam on the second support rotating means between the retracted position and the extended position of the second beam. A first pair of opposed second roller members are rotatably connected to the second beam adapted for rolling along corresponding inner tracks of the second extension.

In a preferred embodiment, the first and second guide means may be a linear longitudinal extension which meets with an annular groove on the surface of the rolling means.

Preferably, a stop means is included to stop extension or retraction of the rail system at any point between and including the fully retracted and fully extended positions. Advantageously, latch means may be provided to latch the beams in the fully retracted position. Preferably, means is provided to simultaneously open the latch means and stop means to retract the beams.

According to an alternative of the invention, a brake means is provided for releasably securing an extendable beam with respect to a support structure. The system provides a tube adjacent the beam extending substantially the length of the beam, first member connected to the beam having a first opening extending through the first member for slidable movement of the tube therethrough, and a second member having an opening therethrough for slidable movement of the tube therethrough, the opening having an axis offset from the axis of the first opening. Also provided is a twisting means rotatably attaching the first and second members for twisting the second member with respect to the first member to a position wherein the openings are in co-axial alignment. The tube is slidable within the openings when the openings are in co-axial alignment and the tube is prevented from slidable movement within the openings when the openings are not in co-axial alignment.

DETAILED DESCRIPTION OF THE INVENTION

Figure 10:
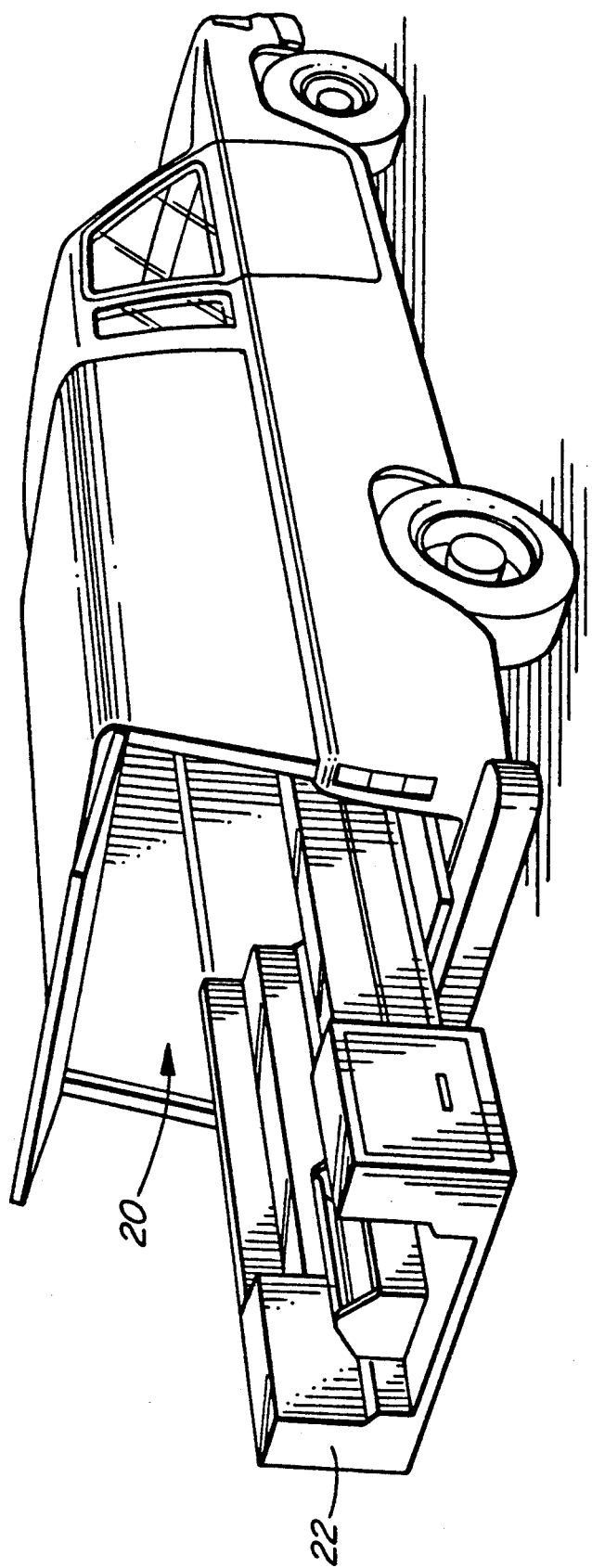
FIG. 10 is a perspective view of a vehicle having the rail system of the present invention mounted in the vehicle storage area and having a storage container mounted on the rail system.

For general purposes of illustration, FIG. 10 shows a typical vehicle having a storage area 20 in which is mounted a rail system to which a storage container 22 is mounted. It should be kept in mind that it is not necessary to describe the rail system of the present invention with respect to a particular vehicle or other support structure or with respect to other environments such as warehouse shelving, drawers and the like. The use of this invention in the storage areas of vehicles such as vans, pick-up trucks and buses, and in non-vehicle environments such as warehouse shelving and the like and as an extendable support for a hoist, are all contemplated by this invention.

As well, it should be appreciated that the rail system of the present invention is designed to operate with only one rail system supporting storage container 22 and that no element of storage container 22 is needed to provide support or strength to the rail system.

Figure 1:
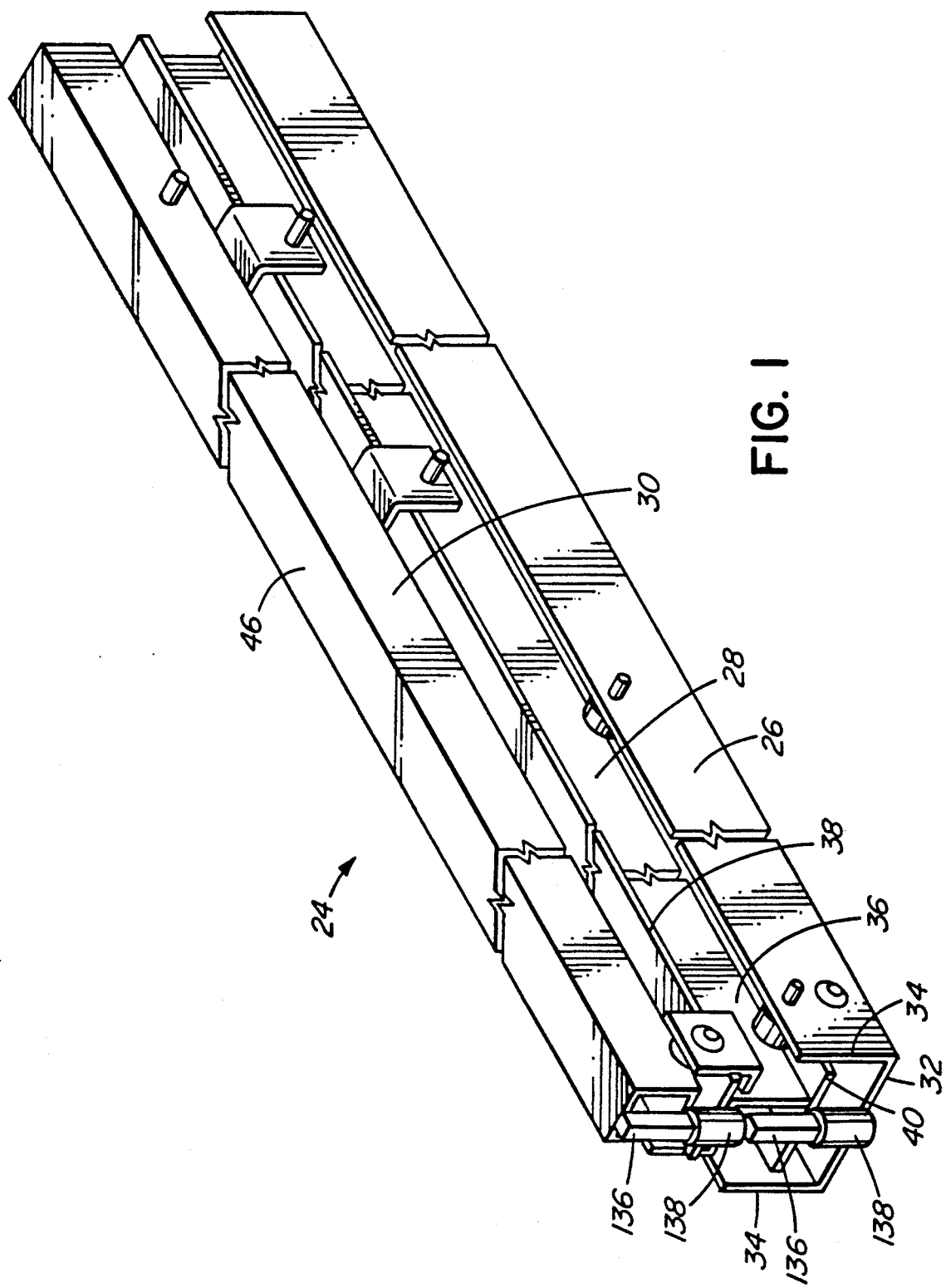
FIG. 1 is a perspective view of the extendable rail system of the present invention in the retracted position, with the brake removed.

Referring to FIG. 1 of the drawings, the extendable rail system of the present invention is generally shown at 24. System 24 is shown in a fully retracted position and includes three main elements: support beam 26, slide beam 28 and storage beam 30.

Support beam 26 is rigidly attached to the support structure (not shown) which may be the bottom or floor structure of a van storage area. Support beam 26 includes a horizontal base member 32 and a pair of opposed upstanding parallel side members 34 attached to base member 32. Base member 32 is affixed to the support structure by means, for example, of bolts (not shown).

Figure 3:
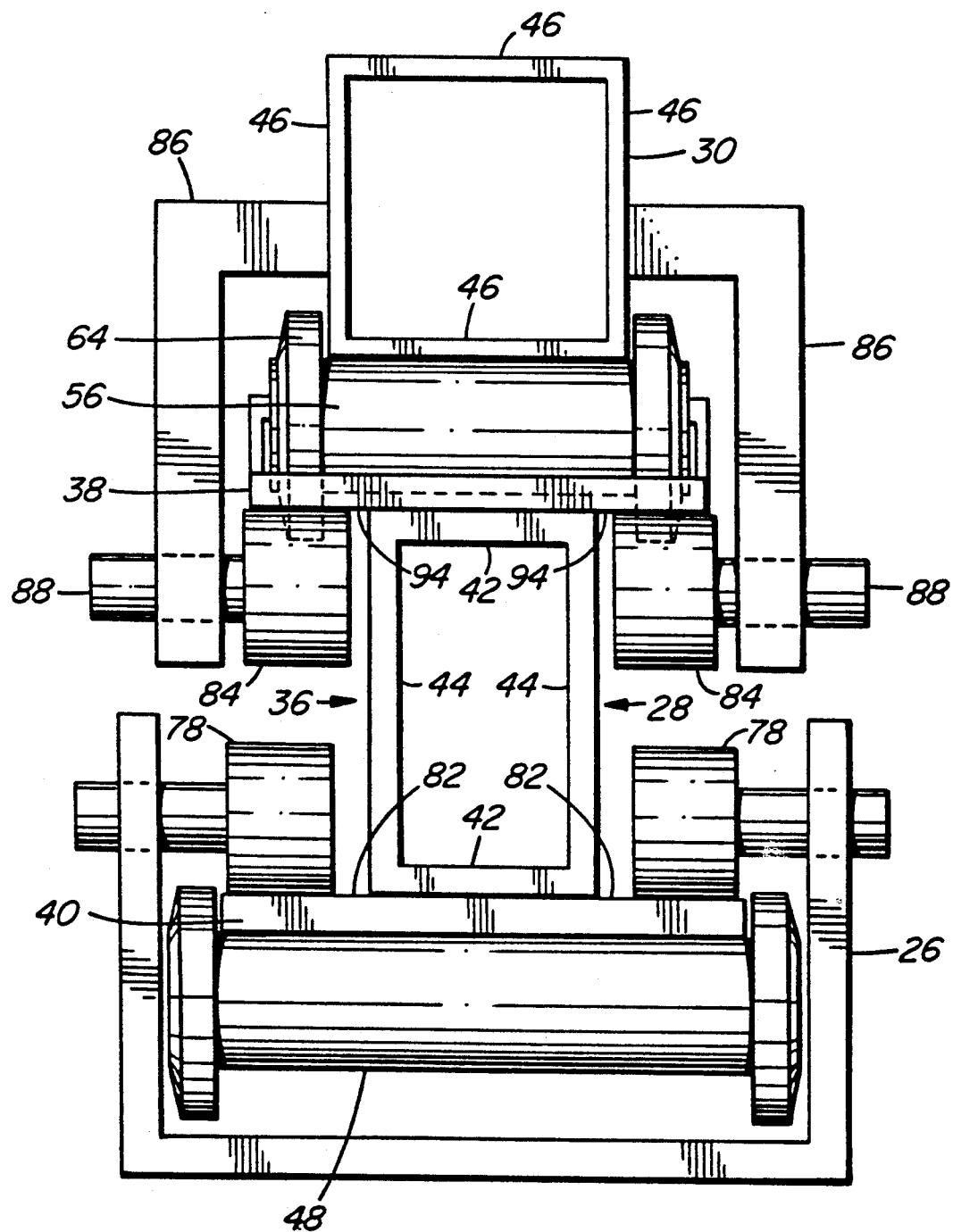
FIG. 3 is a front plan view of the system of FIG. 1.

Slide beam 28 comprises a central member 36 between and attached to upper flange 38 at the top and lower flange 40 at the bottom. As is best seen in FIG. 3, upper flange 38 is narrower than lower flange 40. FIG. 3 also shows the rectangular cross-section of central member 36 with top and bottom members 42 and side members 44. This provides added strength to slide beam 28. As well, slide beam 28 may be strengthened further, as desired, merely by providing side members 44 of thicker cross-section. Advantageously, if such thicker members are positioned with outer sides in the same position as with a thinner side wall, the distance which flanges 38 and 40 extend from the outside side members 44 remains unchanged. The opening between side members 44 would be smaller if side members of increased thickness are used.

Storage beam 30 is of generally square shaped cross-section with four side members 46, as seen best in FIG. 3. Storage beam 30 is used to support the storage container 22 (FIG. 10) to permit extension of the storage container as system 24 is extended. Beams 26, 28 and 30 are generally of equal length, determined generally by the size of the support structure and by the extension requirements.

Figure 2:
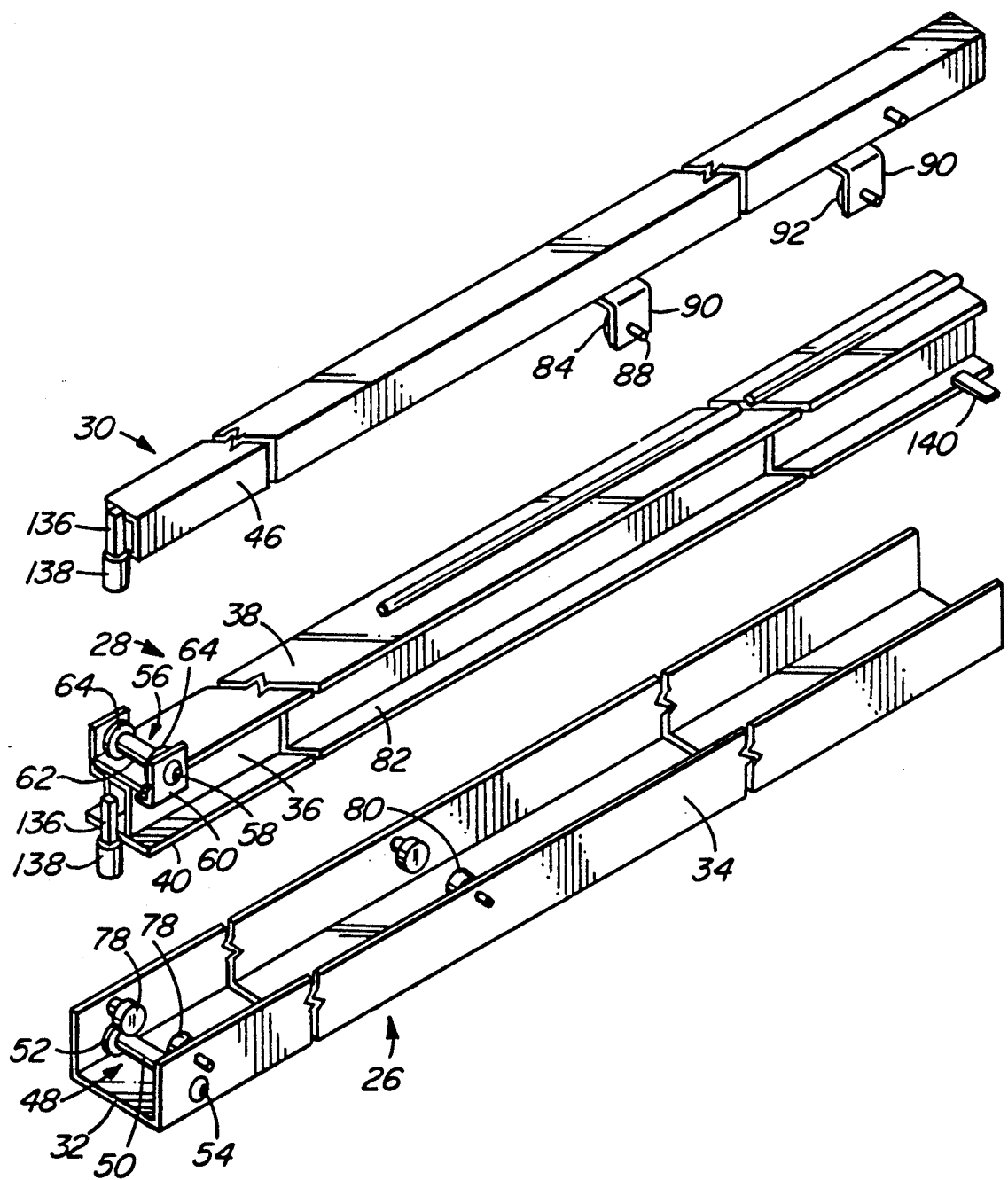
FIG. 2 is an exploded perspective view of the system of FIG. 1.

Referring to FIGS. 2 and 3, support load roller 48 is rotatably connected to opposite side members 34 of support beam 26 for rotation about a horizontal axis perpendicular to the plane of side member 34. Load roller 48 has a central extended cylindrical portion 50 and a pair of annular extensions 52 at each end. As is best seen in FIG. 3, the distance between extensions 52 is just slightly greater than the width of lower flange 40 and, in operation, flange 40 rests on cylindrical portion 50 between extensions 52. This assists to guide flange 40, and thereby, slide beam 28, to move in a pre-determined direction between extensions 52 as beam 28 is extended and retracted.

Load roller 48 is rotatably connected to side members 34 by means of roller axle 54 extending through co-axial opening (not shown) of load roller 48. Preferably, load roller 48 has a plurality of pin bearings about the circumference of the axial opening of load roller 48 to facilitate rotation of load roller 48.

Similarly, slide load roller 56 is rotatably connected to slide beam 28 adjacent the front of the slide beam for rotation about a horizontal axis. Roller axle 58 extends through co-axial opening (not shown) of load roller 56. Roller axle 58 is attached to opposite L-shaped flange members 60 which are attached to upper flange 38 and which extend upwardly to form a flat plate to which roller axles 58 are attached. Preferably, load roller 56 has a plurality of pin bearings about the circumference of the opening in load roller 56 to facilitate rotation of the load roller.

Load roller 56 includes a central extended cylindrical portion 62 and a pair of annular extensions 64 at each end. As best seen in FIG. 3, the distance between extensions 64 is just slightly greater than the width of lower side 46 of storage beam 30. In operation, lower side 46 rests on cylindrical portion 62 between extensions 64. This assists to guide side 46, and thereby storage beam 30, to move in a pre-determined direction between extensions 64 as beam 30 is extended and retracted.

Figure 9:
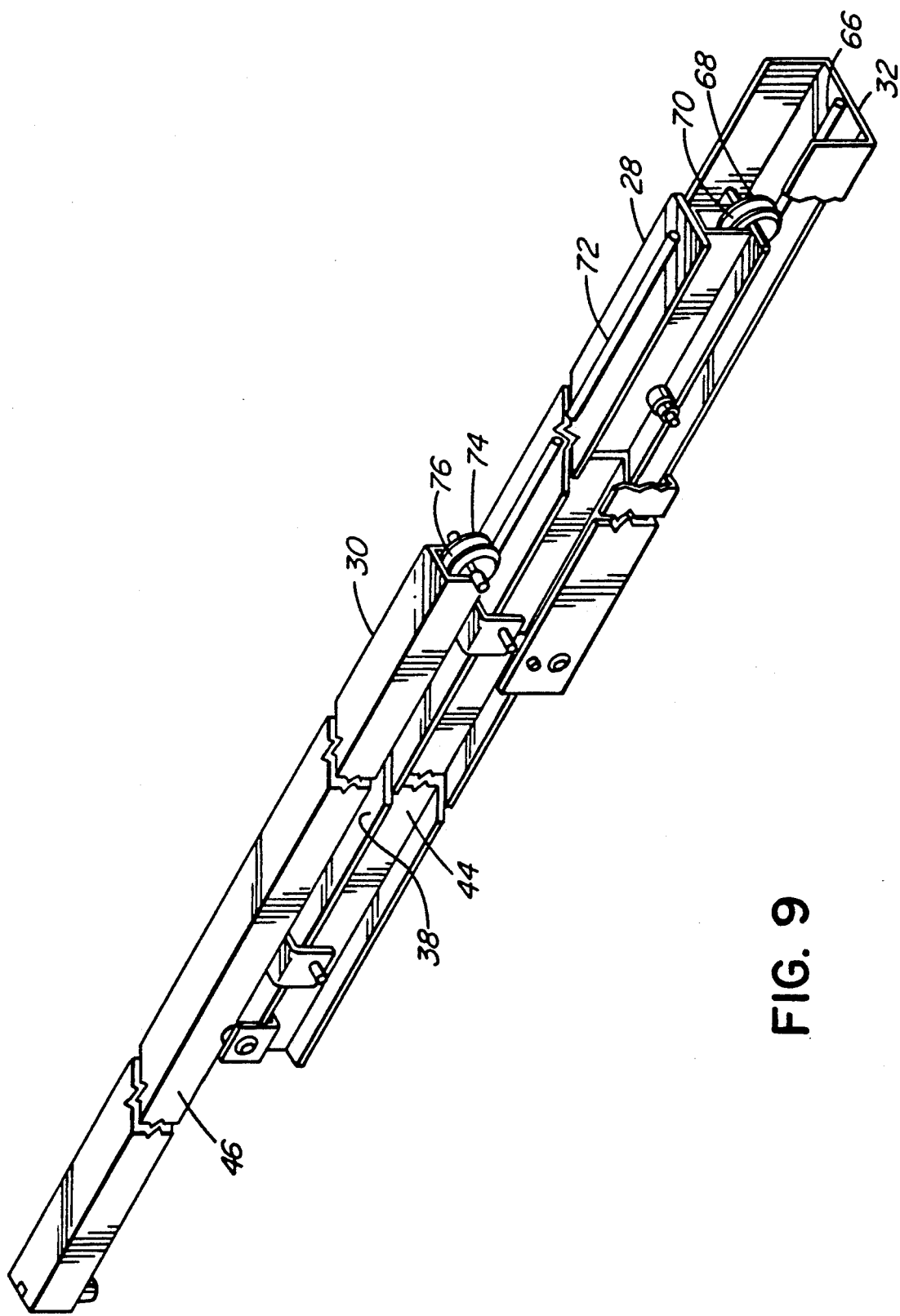
FIG. 9 is perspective view of the system, from the rear.

As seen in FIG. 9, circular rod 66 is rigidly attached to the center of base member 32 and extends longitudinally along base member from a point adjacent the rear end of base member 32 to a point slightly beyond the centre point of base member 32.

Slide beam 28 has a rolling means comprising a roller 68 rotatably attached to slide beam 28 at the rear end of the slide beam extending downwardly from slide beam 28. Roller 68 includes an annular groove 70 about the outer circumference of roller 68 adapted to engage and roll along rod 66. Roller 68 supports the rear end of slide beam 28 and acts to guide slide beam 28 in a pre-determined direction, as the slide beam moves from a fully retracted position to a fully extended position by roller 68 rolling on rod 66 of base member 32. As seen best in FIG. 4, roller 68 is supported entirely by rod 66 and does not contact slide beam 28. This, and the round cross-section of rod 66, serve to minimize the possibility of dirt and other foreign material interfering with the rolling of roller 68 on rod 66 and the movement of slide beam 28.

As seen in FIG. 9, preferably the width of roller 68 is small enough to fit and rotate within the space between side members 44 of slide beam 28. This partially covers roller 68 to reduce the possibility that dirt and other foreign matter may adhere to roller 68 and cause difficulties in movement of beam 28. Rod 66 is circular in cross-section to reduce the possibility of dirt and other foreign matter adhering to rod 66 and interfering with the movement of roller 68 on rod 66 as slide beam 28 is moved. Rod 66 and roller 68 act as a guide means to guide slide beam 28 in a pre-determined direction along substantially the length of rod 66.

Similarly, circular rod 72 is rigidly attached to the centre of upper flange 38 of slide beam 28. Rod 72 extends longitudinally along upper flange 38 from a point adjacent the rear end of flange 38 to a point slightly beyond the centre point of flange 38.

Storage beam 30 has a rolling means comprising a roller 74 rotatably attached adjacent the rear end of storage beam 38 extending downwardly from the storage beam. Roller 74 includes an annular groove 76 about the outer circumference of roller 74. Groove 76 is adapted to engage and roll along rod 72. Roller 74 supports the rear end of storage beam 30 and acts to guide storage beam 30 in a pre-determined direction, as the storage beam moves from a fully retracted position to a fully extended position by rolling on rod 72 of flange 38. Roller 74 is supported entirely by rod 72 and does not contact base member 32. This minimized the possibility of dirt and other foreign matter on slide beam 28 interfering with the rolling of roller 74 on rod 72.

The width of roller 74 is preferably small enough so that roller 74 fits and rotates within side member 46 of storage beam 30. Roller 74 is thereby partially covered by side members 46 to reduce the possibility of dirt and other foreign matter adhering to roller 74 interfering with smooth movement of storage beam 30. Rod 72 is circular in cross-section to reduce the possibility of dirt and other foreign matter adhering to rod 72 and interfering with the movement of roller 74 on rod 72 as storage beam 30 is moved. Rod 72 and roller 74 act as a guide means to guide storage beam 30 in a pre-determined direction along substantially the length of rod 72.

Figure 4:
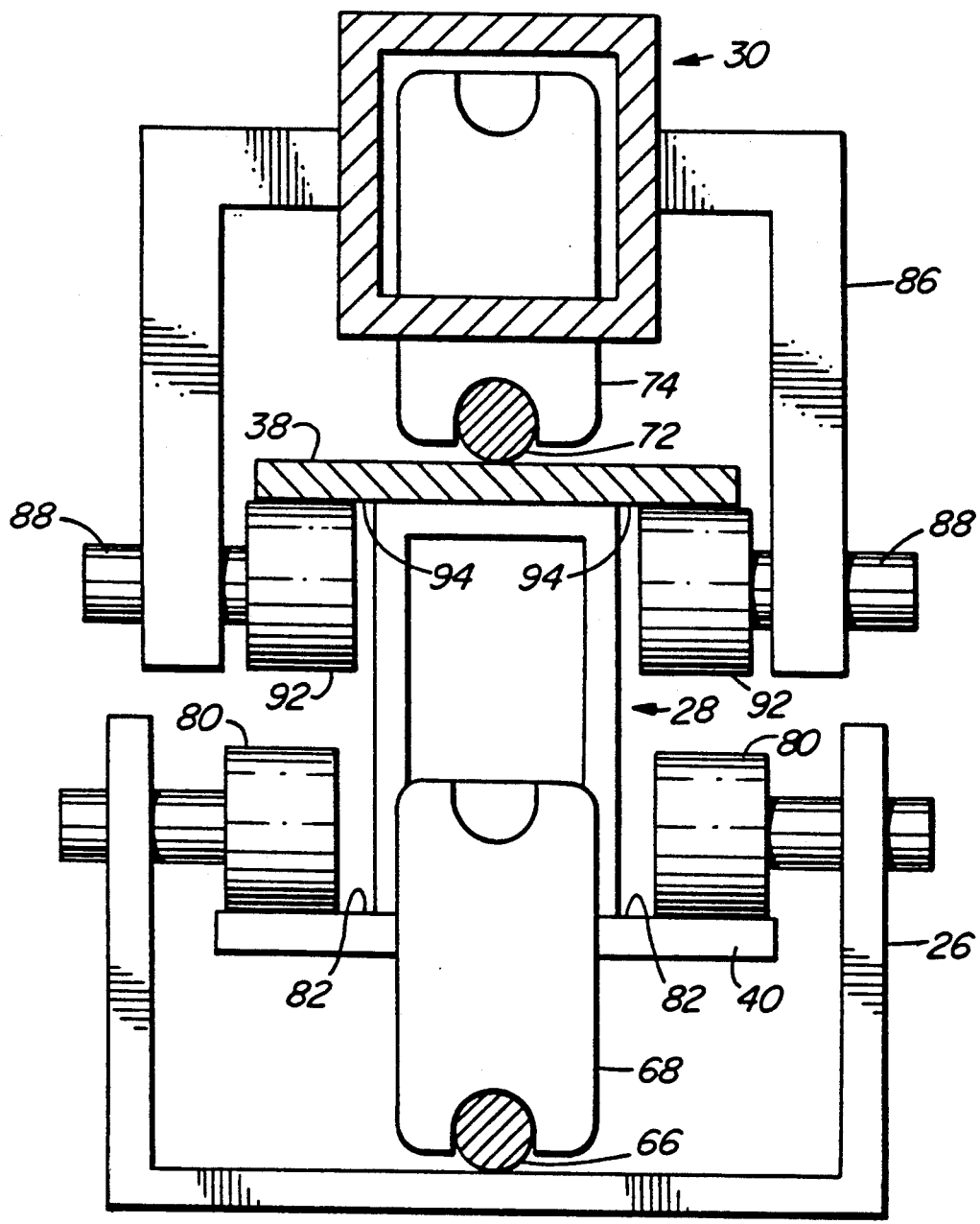
FIG. 4 is a rear plan view of the system of FIG. 1.

Referring to FIGS. 2, 3 and 4, a first pair of opposed lower rollers 78 are rotatably attached to side member 34 above support load roller 48 with space between the horizontal lower plane of rollers 78 and the horizontal upper plane of cylindrical portion 50 of roller 48 to sandwich lower flange 40 therebetween. In addition, a second pair of opposed lower rollers 80 are rotatably attached to side members 34 at a point adjacent to the mid-point of support beam 26. Rollers 80 are aligned in the same plane as rollers 78 and rollers 78 and 80 roll along opposite inner tracks 82 of lower flange 40. Rollers 78 and 80 prevent twisting movement of slide rail 28 and rotate to assist slide rail 28 to move between the retracted position and the extended position of slide rail 28 as rollers 78 and 80 roll along inner tracks 82 of lower flange 40. Rollers 78 and 80 also prevent slide beam 28 from lifting off or separating from support beam 26 and keep rollers 48 and 68 against inner track 82 of lower flange 40. Slide beam 28 is supported from below by roller 48 at one end and by roller 68 at the other end and is sandwiched from the top by rollers 78 and 80 on track 82.

A first pair of opposed upper rollers 84 are rotatably attached to storage beam 30 at approximately the mid-point of storage beam 30. This is done in one of two alternative ways. As seen in FIG. 3, a pair of downwardly extending L-shaped brackets 86 are attached to opposite sides 34 of storage beam 30 at one end and to axle shaft 88 of rollers 84 at the other end. Axle shafts 88 are, in turn, rotatably attached to corresponding rollers 84. Alternatively, as seen in FIG. 2, a pair of opposed L-shaped brackets 90 similar to brackets 86 are attached to the bottom side member 34 of storage beam 30. Axle shafts 88 are attached thereto and rollers 84 are rotatably attached to shafts 88.

A second pair of opposed upper rollers 92 are rotatably attached to storage beam 30 adjacent the rear end of the storage beam by means of brackets 86 or brackets 88. Rollers 92 are aligned in the same plane as rollers 84 and rollers 84 and 92 roll along opposite inner tracks 94 of upper flange 38. Rollers 84 and 92 prevent twisting movement of storage rail 30 and rotate to assist rail 30 to move between the retracted position and the extended position of storage rail 30 as rollers 84 and 92 roll along inner tracks 94. In the manner described above, storage beam 30 is supported from below by roller 56 at one end and by roller 74 at the other end and is sandwiched from the top by rollers 84 and 92 on track 94 of upper flange 38.

The brake means and latch means will now be described with reference to FIGS. 5, 6, 7 and 8. The brake means is designed to stop horizontal movement of beams 28 and 30 at any point between and including the retracted position (shown in FIG. 1) and the extended position (shown in FIG. 5).

Figure 5:
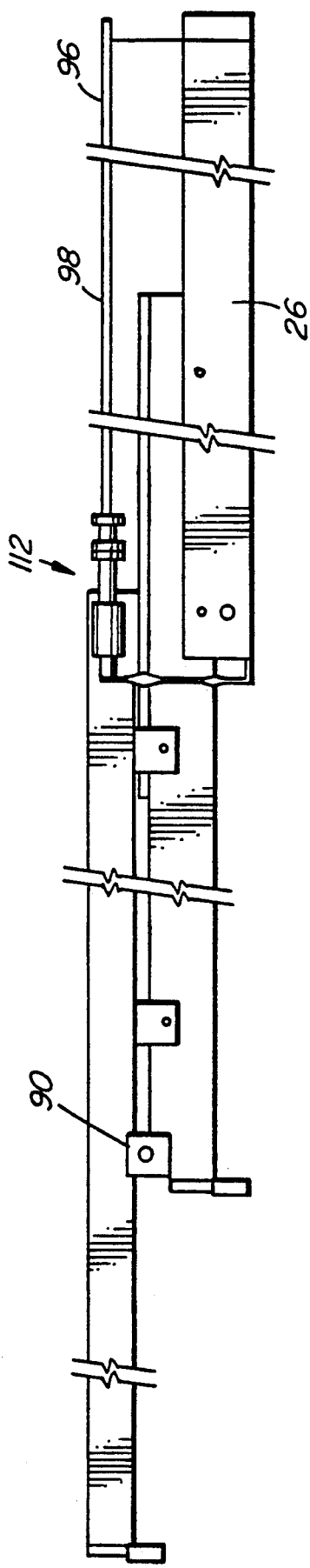
FIG. 5 is a side view of the rail system of the present invention in the extended position showing the brake system.
Figure 6:
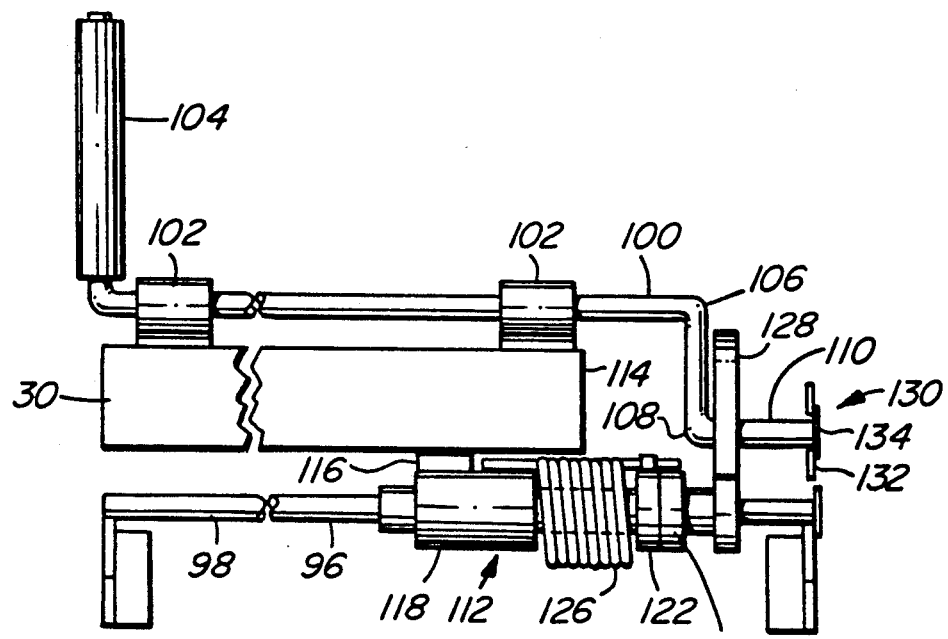
FIG. 6 is a top plan view of the system of FIG. 5 with a section broken away.

As seen best in FIGS. 5 and 6, rod 96 is attached to support beam 26, adjacent each end of support beam 26 and has an upper horizontal rod beam portion 98 extending substantially the length of support beam 26. Rod 96 is generally co-planar in a horizontal plane with storage beam 30 and portion 98 is offset to one side of beam 26. As seen in FIG. 6, a similar steel rod 100 is pivotally attached to storage beam 30 by means of two supports 102 affixed to beam 30. Supports 102 each have a circular opening with a co-linear axis through which rod 100 may be rotated. The outer end of rod 100 is L-shaped with handle 104 attached to the segment of rod 100 bent laterally from beam 26. The inner end of rod 100 is bent into two L-shaped bends, bend 106 directs rod 100 in the direction of portion 98 and bend 108 directs end section 110 of rod 100 parallel with portion 98. End section 110 is co-planar in a horizontal plane with portion 98.

Brake 112 is rigidly attached to storage beam 30 adjacent inner end 114 by means of connector 116. Brake 112 includes base portion 118 rigidly connected to connector 116. Base portion 118 has a circular opening 120 (seen in FIG. 7) through which portion 98 may slide. The axis of opening 120 in portion 118 is offset to one side from the axis of portion 118. Rotating portion 122 is rotatably attached to base portion 118 and has an opening (not shown) therethrough, through which portion 98 extends. The axis of the opening of portion 122 is offset to one side from the axis of opening 120. Rotating portion 122 is rotatable about base portion 118 between a locked position (shown in FIG. 7) and an unlocked position (shown in FIG. 7). When in the locked position, the axis of opening in portion 122 is offset from the axis of opening 120. Consequently, the openings are offset and the channel through the openings is smaller than in the aligned position. The channel is sufficiently small to engage and prevent movement of portion 98 in the openings. Portion 98 is thereby secured to portions 118 and 122. In turn, storage beam is secured or locked to portion 98 and cannot move horizontally. In the unlocked position, the opening in portion 122 and opening 120 are in co-axial alignment allowing free movement of portion 98 through the openings. Storage beam 30 and brake 112 are then moveable along portion 98 between and including the retracted position and extended position.

Figure 7A:
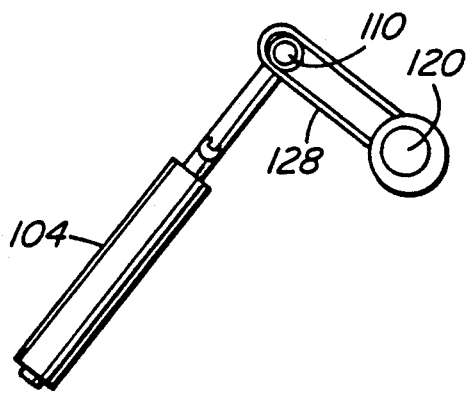
FIGS. 7A, 7B and 7C are end views of the brake system of the present invention in fully locked, intermediate and fully unlocked positions, respectively.
Figure 7B:
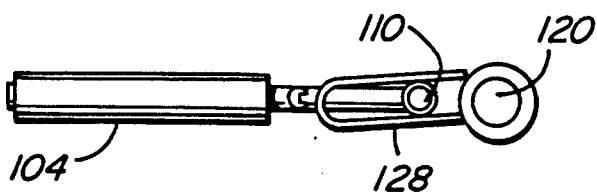
Figure 7C:
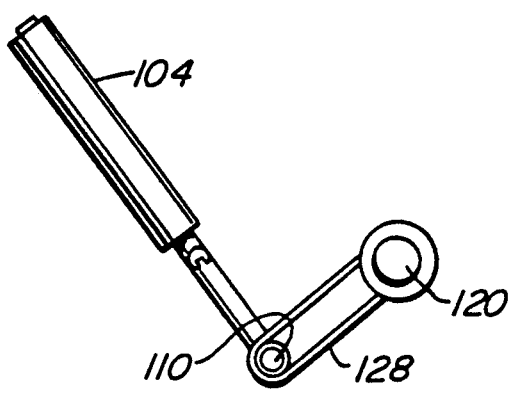

Preferably, a biasing means such as spring 126 is provided to bias rotating portion 122 in its locked position. End 110 is connected to rotating portion 122 by means of capsule shaped coupling 128 permitting rotation of rotating portion 122 between the locked position and the unlocked position on rotation of rod 100 by manual rotation of handle 104. Movement of end section 110 within coupling 128 between the locked position and unlocked position is shown in FIG. 7.

Figure 8B:
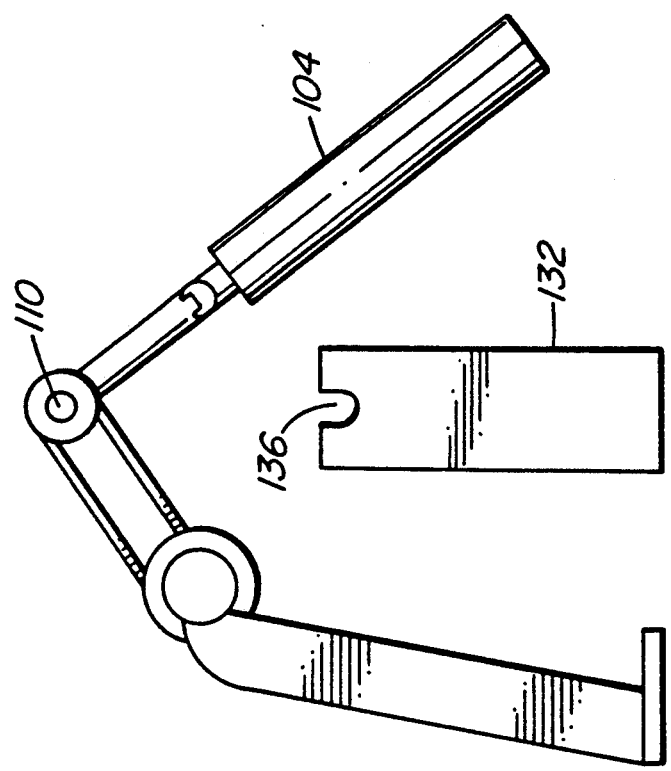
FIGS. 8A and 8B are end views of the latch system of the present invention in a latched position and an unlatched position, respectively.
Figure 8A:
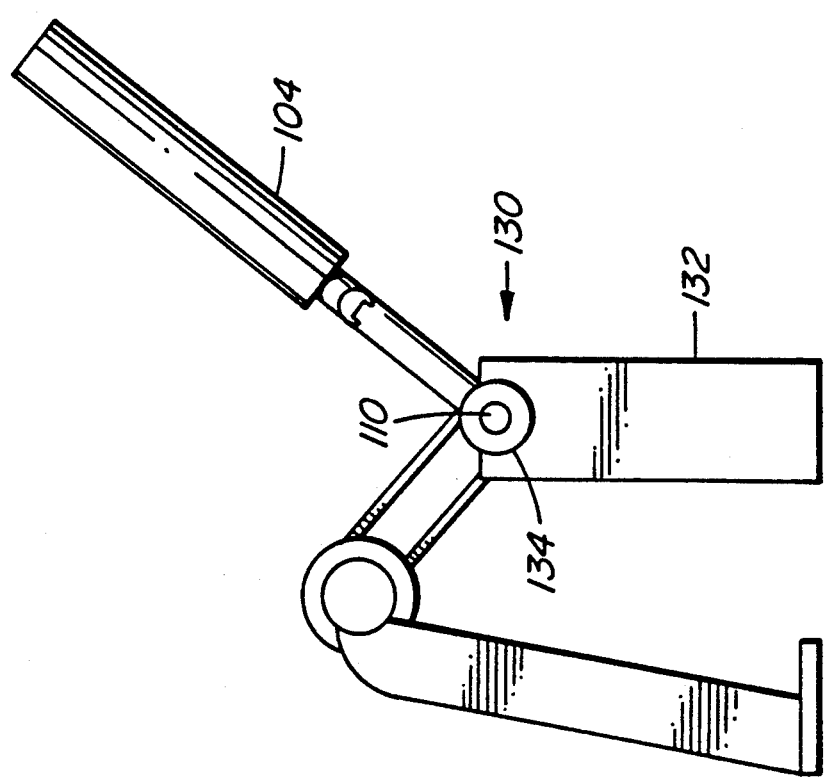

Referring to FIG. 8, latch mechanism 130 is shown in the latched position and unlatched position. In addition, latch mechanism 130 is shown in the latched position in FIG. 6. Support body 132 is attached to the supporting superstructure (not shown) and extends vertically in a plane intersecting the inner end of rod 100. Keeper 134 is attached to end of end section 110 to extend slightly past body 132 on rod 100. End section 110 is aligned with upper slot 136 and is slidable therein when latch means 130 is in the latched position as shown in FIG. 8. On rotation of handle 104, end section 110 moves upwardly from slot 136 to unlatch rod 100 and to permit horizontal movement of storage beam 30. Preferably, handle 104 and end section 110 are oriented such that section 110 is in the latched position in slot 136 at the same time as rotating portion 122 is in the locked position and end section 110 is in the unlatched position when rotating portion 122 is in the unlocked position both being determined by movement of handle 104. Spring 126 also biases end section 110 in the latched position.

OPERATION

In operation, a set of support beams 26 are attached to the superstructure of the particular storage area required. Optionally, two sets of support beams 26 may be used in spaced parallel relationship. For example, beams 26 may be attached to the storage area in a van, pickup truck or bus tank for movement of beams 28 and 30 towards and out the opening to the storage area. Alternatively, beams 26 may be attached to the support structure of a warehouse storage area for extension of beams 28 and 30 from the storage area to an aisle area of the warehouse for loading or unloading of contents of the storage area. Warehouses typically employ several vertical shelf areas for storing goods access able from the side. A set of systems 24 may be attached to each of the storage areas to permit a storage container to be moved horizontally into the aisle area for loading or unloading from above.

Initially, beams 28 and 30 are in the fully retracted position held in place by latch means 130 in the latched position and by brake 112 in the locked position. Spring 126 holds rotating means 122 in the locked position and end section 110 in the latched position.

To move beams 28 and 30 to the extended position or to an intermediate position, a user applies rotational motion on handle 104. This motion moves inner section 110 upwardly and out of slot 136. Simultaneously, this motion rotates rotating portion 122 with respect to base portion 118 to align opening 120 and the opening in rotating portion 122 thereby unlocking brake 112.

The user may then apply horizontal pulling pressure on handle which, through coupling 128, brake 112 and connector 116 will pull storage beam 30 horizontally outwardly along slide rail 28. Storage beam 30 is supported at the outer end by slide load roller 56 and at the inner end by roller 74. Rod 72 guides roller 74 and storage beam 30 in a horizontal direction in a line parallel to beams 26 and 28. Rollers 84 and 92 prevent twisting of storage beam 30 as it is moved outwardly. Beam 30 is moved outwardly until bracket 90 contacts flange 64. Continued horizontal pulling pressure on handle 104 will then cause slide beam 28 to move outwardly supported by support load roller 48 at an outer end and by roller 68 at an inner end. Rollers 78 and 80 prevent twisting of slide beam 28 as it is moved outwardly. Slide beam 28 is moved outwardly until slide flange 140 adjacent the end of slide beam 28 contacts slide flange (not shown) on beam 26, thereby preventing further outward movement of slide beam 28. Contact slide flange is positioned on the side of rollers 80 opposite to the direction of roller 48 and is attached to the inside of side members 34.

In this manner, storage beam 30 is moved horizontally outwardly, substantially the full length of beam 30, in relation to support beam 26, to the fully extended position shown in FIG. 5. When in this position, beam 30 is supported by beam 28, load rollers 48 and 56 and rollers 78, 80, 84 and 92 which hold beam 30 horizontal when downward pressure is placed on the outer end of beam 30.

Brake 112 may be applied at any position of storage beam 30 between and including the fully retracted position and the fully extended position by moving storage beam 30 to a particular position, then releasing handle 104. Spring 126 then moves rotating portion 122 to the locked position to lock brake 112. This prevents horizontal movement of storage beam 30 until handle 104 is rotated against spring 126 to rotate rotating portion 122 to the unlocked position.

As seen in FIGS. 1 and 2, each outer end of beams 28 and 30 include downwardly extending boss 136 partially covered with resilient rubber-like bumper 138. Bumper 13 on slide beam 28 contacts the outer end of support beam 26 to prevent further inward movement of slide beam 28. Similarly, bumper 138 on storage beam 30 contacts the outer end of slide beam 28 to prevent further inward movement of storage beam 30.

It is to be understood that the scope of the invention is not limited by the foregoing description, but is set forth in the following claims.

We claim:

1. An extendable rail system for extending and retracting in a pre-determined direction in relation to a support structure, comprising:
   (a) a first beam;
   (b) a first flange extending laterally along a first side of said first beam to form parallel, spaced inner tracks along a first face of said first flange adjacent said first beam;
   (c) first rolling means rotatably connected to said first beam for movement with said first beam on said support structure;
   (d) first guide means connected to said support structure for guiding said first rolling means in said pre-determined direction, said first rolling means being responsive to said first guide means to move in said pre-determined direction;
   (e) first support means connected to said support structure for supporting said first beam as said first beam moves between the retracted position and the extended position;
   (f) first support guiding means connected to said first support means for guiding said first beam on said first support means in said pre-determined direction, said first beam being responsive to said first support guiding means to move in said pre-determined direction;
   (g) a first pair of opposed first roller members rotatably connected to said support structure, each first roller adapted for rolling along a corresponding inner track of said first flange to constrain said first beam against said first support means and to constrain said first rolling means against said support structure as said first beam is moved between its retracted position and its extended position.

2. A system as described in claim 1 wherein said first guide means comprises a first longitudinal extension extending perpendicular to said support structure parallel to said pre-determined direction and said first rolling means comprises a round wheel having an annular groove on the outer surface thereof mating with said extension.

3. A system as described in claim 2 wherein said first extension has a generally circular cross-section.

4. A system as described in claim 1 further comprising brake means for releasably preventing said first and second beams from extending and retracting.

5. A system as described in claim 4 wherein said brake means is capable of preventing extension and retraction of said first and second beams in any position between and including said retracted position and said extended position.

6. A system as described in claim 5 further comprising latching means for releasably latching said first and second beam in said retracted position.

7. A system as described in claim 6 further comprising release means for simultaneously releasing said brake means and said latching means.

8. A system as described in claim 4 wherein said brake means comprises an elongated rod adjacent to said first beam connected to said support structure extending substantially the length of said first beam when said first beam is in a retracted position, a first member having a first opening, a second member having a second opening and twisting means rotatably attaching said first and second members for twisting said first member with respect to said second member to a position wherein said openings are not in co-axial alignment, and wherein said rod extends through said first and second openings.

9. A system as described in claim 8 further comprising biasing means for biasing said brake means to a position wherein said openings are not in co-axial alignment.

10. A system as described in claim 9 wherein said biasing means is a spring.

11. A system as described in claim 1 wherein said first support guiding means includes a pair of annular opposed ridge members adjacent each end of said first support means, aligned with and adjacent the outer edges of said first flange.

12. A system as described in claim 1 further comprising a second pair of first roller members spaced along said beam from said first pair of first roller members, rotatably connected to said support structure and adapted for rolling along said corresponding inner track of said first flange to constrain said first beam against said first support means and to constrain said first rolling means against said support structure as said first beam is moved between its retracted position and its extended position.

13. A system as described in claim 1 wherein said first beam includes a pair of spaced parallel side members joined by spaced parallel first and second cross members perpendicular to said side members to form a square cross-section, said cross members joining in parallel alignment with said first and second flanges.

14. A system as described in claim 1 further comprising first retracting stop means on a first end of said first beam for preventing said first end from retracting past a corresponding first end of said support structure.

15. A system as described in claim 14 further comprising second retracting stop means on a first end of said second beam for preventing said first end from retracting past said first end of said first beam.

16. A system as described in claim 1 further comprising a first extension stop means comprising first stop member on said first beam and a first contacting stop member on said support structure in horizontal planar alignment with said first stop member for preventing said first beam from moving past a pre-determined maximum extension of said first beam.

17. A system as described in claim 1, further comprising:
 (a) a second flange extending laterally along a second side of said first beam, opposite said first side, to form parallel, spaced inner tracks along a first face of said second flange adjacent said first beam;
 (b) a second beam;
 (c) second rolling means rotatably connected to said second beam for movement with said second beam on said first beam;
 (d) second guide means connected to said first beam for guiding said second rolling means in said pre-determined direction, said second rolling means being responsive to said second guide means to move in said pre-determined direction;
 (e) second support means connected to said first beam for supporting said second beam as said second beam moves between the retracted position and the extended position;
 (f) second support guiding means connected to said second support means for guiding said second beam on said second support means in said pre-determined direction, said second beam being responsive to said second support guiding means to move in said pre-determined direction;
 (g) a first pair of opposed second roller members rotatably connected to said second beam, each second roller adapted for rolling along a corresponding inner track of said second flange to constrain said second beam against said second support means and to constrain said second rolling means against said first beam as said second beam is moved between its retracted position and its extended position.

18. A system as described in claim 17 wherein said second guide means comprises a second longitudinal extension extending perpendicular to said first beam parallel to said pre-determined direction and said second rolling means comprises a round wheel having an annular groove on the outer surface thereof mating with said extension.

19. A system as described in claim 18 wherein said second extension has a generally circular cross-section.

20. A system as described in claim 17 wherein said second support guiding means comprises a pair of annular opposed ridge members adjacent each end of said second support means, aligned with and adjacent the outer edges of said first beam.

21. A system as described in claim 17 further comprising a second pair of second roller members spaced along said second beam from said first pair of second roller members, rotatably connected to said second beam and adapted for rolling along said corresponding inner track of said second flange to constrain said second beam against said second support means and to constrain said second rolling means against said first beam as said second beam is moved between its retracted position and its extended position.

22. A system as described in claim 17 wherein said second beam comprises a pair of spaced parallel side members joined by spaced parallel first and second members perpendicular to said side members to form a square cross-section.

23. A system as described in claim 17 further comprising second extension stop means comprising a second stop member on said second beam and a second contacting stop member on said first beam in horizontal planar alignment with said second stop member for preventing said second beam from moving past a pre-determined maximum extension of said second beam.

24. A system as described in claim 17 wherein the width of said second flange is greater than the width of said first flange.

25. A system for releasably securing an extendable beam with respect to a support structure, comprising:
 (a) a tube adjacent said beam extending substantially the length of the beam;
 (b) a first member connected to said beam having a first opening extending therethrough for slidable movement of the first member along said tube, said tube extending through said first opening;
 (c) a second member having a second opening extending therethrough for slidable movement of the second member along said tube, said tube extending through said first opening, said second opening having an axis offset from the axis of the first opening; and
 (d) twisting means rotatably attaching said first and second members for twisting said second member with respect to said first member to a position wherein said openings are in co-axial alignment, said first and second members being slidable along said tube when said openings are in co-axial alignment and said first and second members being prevented from slidable movement along said tube when said openings are not in co-axial alignment.

* * * * *